US012583036B2

(12) United States Patent
Herritz et al.

(10) Patent No.: US 12,583,036 B2
(45) Date of Patent: Mar. 24, 2026

(54) CONDUIT REAMER

(71) Applicant: Milwaukee Electric Tool Corporation, Brookfield, WI (US)

(72) Inventors: Devin W. Herritz, Sussex, WI (US); Ian L. Christianson, Wauwatosa, WI (US); Steven W. Hyma, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 929 days.

(21) Appl. No.: 17/226,509

(22) Filed: Apr. 9, 2021

(65) Prior Publication Data

US 2021/0316370 A1      Oct. 14, 2021

Related U.S. Application Data

(63) Continuation of application No. PCT/US2021/024867, filed on Mar. 30, 2021.

(60) Provisional application No. 63/007,619, filed on Apr. 9, 2020.

(51) Int. Cl.
B23B 5/16 (2006.01)
B25G 1/10 (2006.01)
B25B 13/06 (2006.01)
B25B 23/00 (2006.01)

(52) U.S. Cl.
CPC .............. B23B 5/167 (2013.01); B25B 13/06 (2013.01); B25B 23/0035 (2013.01); B25G 1/102 (2013.01)

(58) Field of Classification Search
CPC .... B23B 5/167; B23D 77/14; B23D 2277/04; B23D 2277/20; B23D 2277/50; B23D 2277/02
See application file for complete search history.

(56) References Cited

U.S. PATENT DOCUMENTS

| | | |
|---|---|---|
| 7,651,303 B2 | 1/2010 | Zick et al. |
| 2008/0219790 A1 * | 9/2008 | Zick .................... B23B 31/1071 |
| | | 408/211 |

(Continued)

FOREIGN PATENT DOCUMENTS

| | | | |
|---|---|---|---|
| CN | 107717116 A | 2/2018 | |
| DE | 20216663 U1 * | 12/2002 | ............. B23B 5/167 |

(Continued)

OTHER PUBLICATIONS

English translation of DE 20216663 U1 (Year: 2002).*

(Continued)

*Primary Examiner* — Alan Snyder

(74) *Attorney, Agent, or Firm* — Reinhart Boerner Van Deuren s.c.

(57) ABSTRACT

A conduit reamer with a lanyard receiver, inner and/or outer cutting blades is provided. The lanyard receiver is located along an axis of the handle near the tool's center of gravity. For example, the lanyard receiver is located between the handle and a bit retainer near the center of gravity. In this orientation, the lanyard receiver prevents tipping of the conduit reamer and retains the bit within the bit retainer when the conduit reamer is dropped. The inner and outer cutting blades include an acute angle that is between 45 and 90 degrees to deburr an end of a conduit.

19 Claims, 14 Drawing Sheets

(56)                References Cited

U.S. PATENT DOCUMENTS

2009/0071216 A1 *   3/2009   Pena ....................... B23B 5/167
                                                                72/70
2011/0010933 A1     1/2011   Van Duyne
2013/0055507 A1     3/2013   Li et al.
2014/0260883 A1 *   9/2014   Willburn ................ B26D 3/169
                                                                83/869

FOREIGN PATENT DOCUMENTS

JP          09-272077        10/1997
KR     10-2015-0103963        9/2015

OTHER PUBLICATIONS

Laser Tools, Safety Tool Lanyard- Screwdriver, https://www.lasertools.
co.uk/Product/6875/Safety-Tool-Lanyard-Screwdriver, appears to be
available as early as Sep. 24, 2017, 2 pages.
Proto, Tether-Ready 6 Piece Durateck Slotted Screwdriver Set,
https://www.protoindustrial.com/en/industrial-tools/Proto/Tethered-
Tools/Tether-Ready-Screwdrivers/J1206RSF-TT_Proto%c2%ae-
Tether-Ready-6-Piece-Duratek-Slotted-Screwdriver-Set-/, appears to
be available as early as Oct. 24, 2014, 2 pages.
Proto, Tether-Ready Screwdrivers, https://www.protoindustrial.com/
en/searchlist/SubCategory-Tether-Ready%20Screwdrivers/, appears
to be available as early as Nov. 1, 2019, 1 page.
Ergodyne, Squids 3194 Hand Tool Tethering Kit -1lb / 0.5kg,
https://www.ergodyne.com/squids-3194-hand-tool-tethering-kit-1lb-
0-5kg.html, appears to be available as early as Feb. 5, 2019, 6 pages.
International Search Report and Written Opinion for International
Application No. PCT/US2021/024867, dated Jul. 5, 2021, 10 pages.

* cited by examiner

CONDUIT REAMER

CROSS-REFERENCE TO RELATED PATENT APPLICATION

The present application is a continuation of International Patent Application No. PCT/US2021/024867, filed Mar. 30, 2021, which claims the benefit of and priority to U.S. Provisional Application No. 63/007,619, filed on Apr. 9, 2020, which are incorporated herein by reference in their entireties.

BACKGROUND OF THE INVENTION

The present invention generally relates to the field of reamers used to deburr a sawed edge. The present invention relates specifically to a conduit reamer that deburrs cut pipe or conduit edges.

SUMMARY OF THE INVENTION

One embodiment of the invention relates to a conduit reamer. The conduit reamer includes a handle extending along a longitudinal axis, a bit retainer coupled to the handle, and a first bit coupled to the bit retainer. The first bit includes an inner cutting blade, an outer cutting blade defining an acute angle with respect to the inner cutting blade, and a recess between the inner cutting blade and the outer cutting blade. The inner cutting blade extends radially inwards from the recess with respect to the longitudinal axis, and the outer cutting blade extends radially outwards from the recess with respect to the longitudinal axis. The acute angle is greater than 50 degrees.

Another embodiment of the invention relates to a conduit reamer including a handle extending along a longitudinal axis and defining a first end of the conduit reamer, a bit retainer coupled to the handle and defining a second end of the conduit reamer opposite the first end, and a first bit coupled to the bit retainer. The first bit includes an inner cutting blade and an outer cutting blade. The inner cutting blade extends radially inwards from the outer cutting blade with respect to the longitudinal axis, and the outer cutting blade extends radially outwards from the inner cutting blade with respect to the longitudinal axis. The first bit includes a lanyard receiver coupled to the conduit reamer between the handle and the bit retainer.

Another embodiment of the invention relates to a conduit reamer including a handle extending along a longitudinal axis, a bit retainer coupled to the handle, and a first bit coupled to the bit retainer. The first bit includes an inner cutting blade, and an outer cutting blade extending radially outwards from the inner cutting blade with respect to the longitudinal axis. The inner cutting blade extends radially inwards from the outer cutting blade with respect to the longitudinal axis. The outer cutting blade defines an angle between 22.5 degrees and 45 degrees with respect to the longitudinal axis.

One embodiment of the invention relates to a conduit reamer. The conduit reamer includes a bit retainer and a bit coupled to the bit retainer. The bit has an inner cutting blade and an outer cutting blade forming an acute angle that is greater than 45 degrees with the inner cutting blade. The bit includes an arcuate recess between the inner cutting blade and the outer cutting blade.

Another embodiment of the invention relates to a conduit reamer. The conduit reamer has a handle, a bit retainer, a bit, a slot, and a lanyard. The handle extends along an axial axis and defines a first end. The bit retainer is coupled to the handle and extends along the axial axis. The bit retainer defines a second end opposite the first end. The bit has inner and outer cutting blades coupled to the bit retainer. The slot is located between the handle and the bit retainer. The slot includes a removable lanyard receiver located in the slot between the handle and the bit retainer.

Another embodiment of the invention relates to a conduit reamer with a handle, a bit retainer, a bit, and a lanyard receiver. The handle extends along an axial axis, and the bit retainer is coupled to the handle. The bit retainer is coupled to and supports the bit. The bit has an inner cutting blade and an outer cutting blade formed at an acute angle greater than 45 degrees from the inner cutting blade. The lanyard receiver removably couples a lanyard to the handle.

In various embodiments, the bit retainer of the conduit reamer is used with a hand tool (e.g., with a handle) or a power tool, such as a drill. For example, bit retainer has a shank to which a chuck of a drill can attach to the bit retainer to rotate the bit about a conduit. In some embodiments, bit retainer includes a socket to rotate and drive a fastener (e.g., a flat, Torx, and/or Philips head screwdriver, a nut, and/or a bolt). In some embodiments, bit retainer has multiple notches (e.g., three), each having inner and outer blades to deburr different sized conduit diameters.

The lanyard receiver is near a center of gravity of the handle and the bit retainer. In various embodiments, the lanyard receiver is a removable band with a hole. In some embodiments, the lanyard receiver is a pin spanning a slot or an insert. The lanyard receiver provides access to couple and/or secure a lanyard to the tool. In some embodiments, the bit is made of a toughened and/or hardened carbide steel and includes fastener holes to receive a fastener that retains the bit in the bit retainer.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a conduit reamer are shown. Conduit reamers have notches to receive an end or edge of a pipe or conduit to deburr the edges (e.g., after cutting) before installation. Generally, rotating the cutting blades of the conduit reamer deburrs the inner and outer diameter edges of the conduit. Applicant has found that by adjusting the acute angles of the cutting blades, such that they are between 45 and 90 degrees, the depth or recess distance of the notch is decreased. Acute angles between 45 and 90 degrees result in the removal of a narrower area/volume of the inner and outer diameters at the edge of the conduit during the deburring process. Accordingly, the wide acute angles also improve the ease with which the tool is rotated. Because the wide angles result in a reduced profile, wide acute angles also enhance the ease with which the conduit reamer is inserted or removed from a pocket or pouch. Pouchability refers to the ease of inserting and/or removing a tool from a pouch, for example, without catching or snaring.

In some embodiments, a lanyard is attached to tools, such as a conduit reamer. A lanyard receiver is designed into the conduit reamer to facilitate attachment of a lanyard to the tool. Applicant has found that by placing the lanyard receiver at or near an axial center of gravity of the conduit reamer, bits are not jarred or otherwise pulled out of location when the tool is dropped and/or stopped on the lanyard. For example, bits are inserted into the bit retainer and secured with a fastener and/or installed with a friction fit. In either case, dropping the conduit reamer can dislodge the bit from within the bit retainer. Applicant has found that placement of the lanyard and lanyard receiver at or near the axial center of gravity of the conduit reamer reduces the dislocation of the bits installed within the bit retainer.

Figure 1:
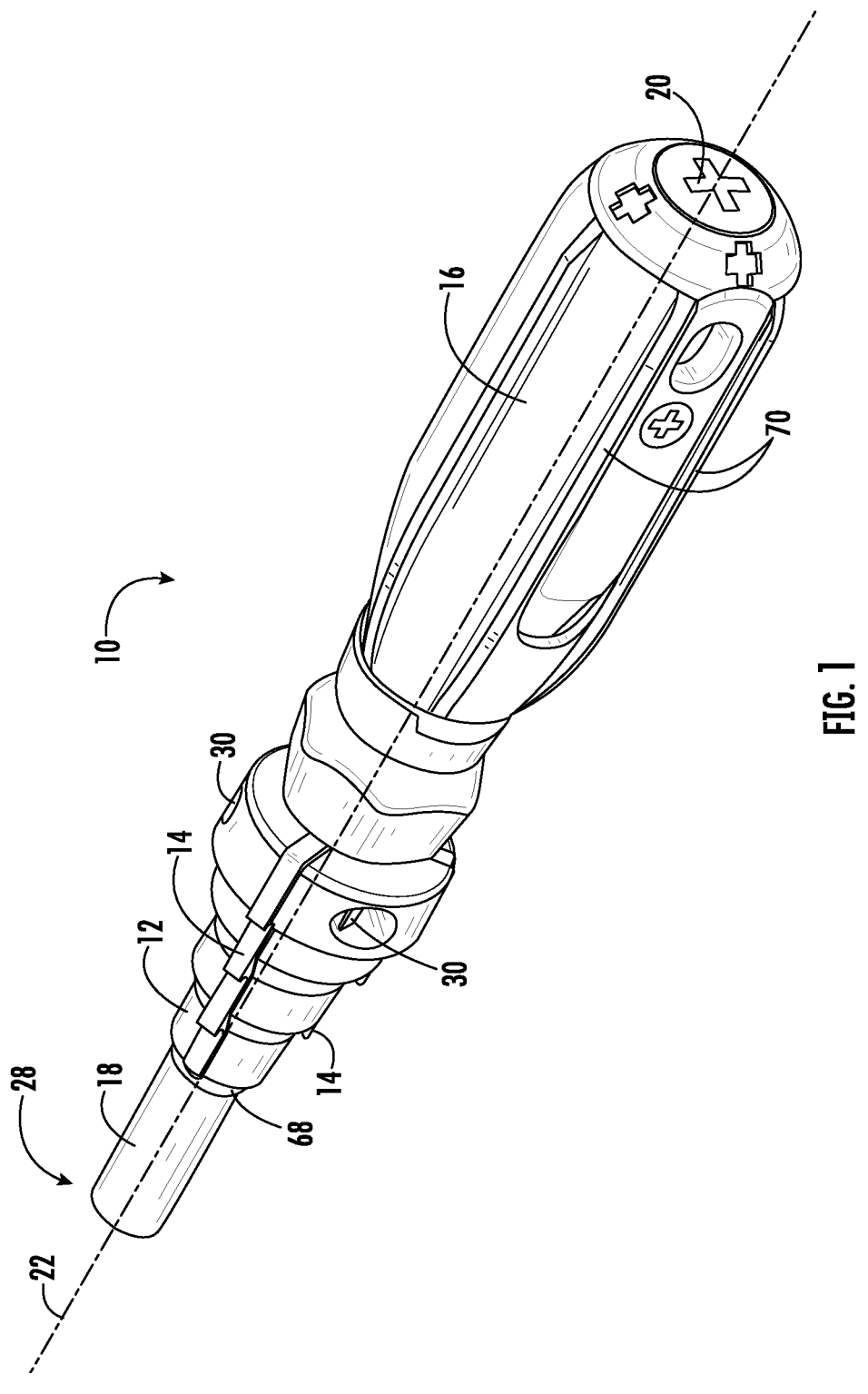
FIG. 1 is a perspective view of a conduit reamer, according to an exemplary embodiment.
Figure 4:
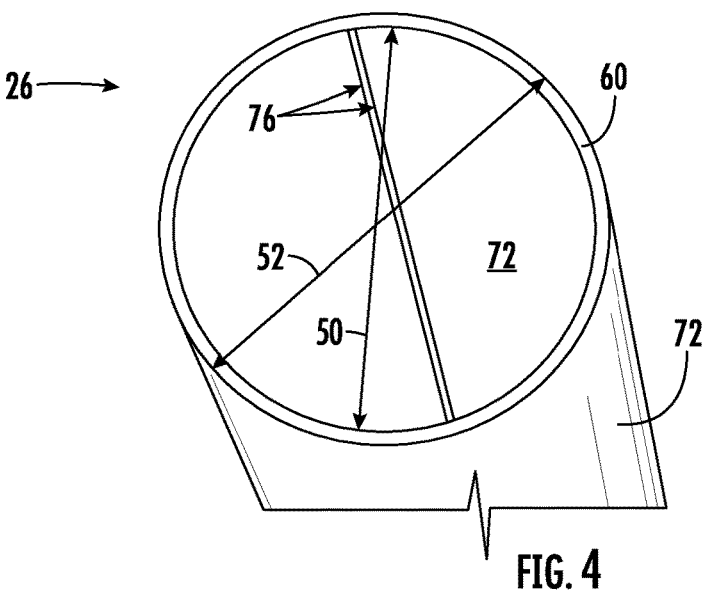
FIG. 4 is a detailed view of a conduit pipe having an inner and outer diameter, according to an exemplary embodiment.

FIG. 1 shows a perspective view of a conduit reamer 10 with a bit retainer 12 and multiple bits 14 installed within bit retainer 12. As shown in FIG. 1, a handle 16 and/or a socket 18 are attached at opposite ends of conduit reamer 10. Handle 16 defines a first end 20 of conduit reamer 10 and extends along a longitudinal or axial axis 22. In some embodiments, handle 16 is removably coupled to a shank 24 (FIG. 2) of bit retainer 12. This configuration enables bit retainer 12 to couple to a power tool, such as a drill, for rotation of the conduit reamer 10. Similarly, handle 16 couples to bit retainer 12 to rotate a blade or bit 14 on bit retainer 12 about an end of pipe to deburr the pipe or conduit 26 (FIG. 4). When coupled to handle 16, bit retainer 12 extends along axial axis 22 to define a second end 28 opposite first end 20.

In some embodiments, conduit reamer 10 further includes socket 18 and/or bit fasteners 30. Socket 18 is configured to use a similar rotation of handle 16 to fasten or loosen a fastener (e.g., a nut or bolt). This configuration enhances the functionality of conduit reamer 10 and makes it a multi-purpose tool. In some embodiments, socket 18 releasably couples to bit retainer 12. Socket 18 and/or bit 14 releasably couple to bit retainer 12, and bit retainer 12 is releasably coupled to handle 16. In this configuration, a user can change socket 18 for different fasteners (e.g., screws, nails, rivets, nuts, etc.). In some embodiments, bit 14 is replaceable, such that one or more bits 14 can be replaced without replacing either conduit reamer 10 or bit retainer 12. In some embodiments, bit retainer 12 includes shank 24 to releasably couple to a handle, a power tool, or a drill.

Bit fasteners 30 are oriented to pass through each bit 14 and secure them inside bit retainer 12. This configuration secures and/or retains bits 14 in bit retainer 12. In some embodiments, bits 14 are removable and/or replaceable, such that an operator loosens bit fasteners 30 to remove bit 14 from bit retainer 12 and install a new bit 14.

Figure 2:
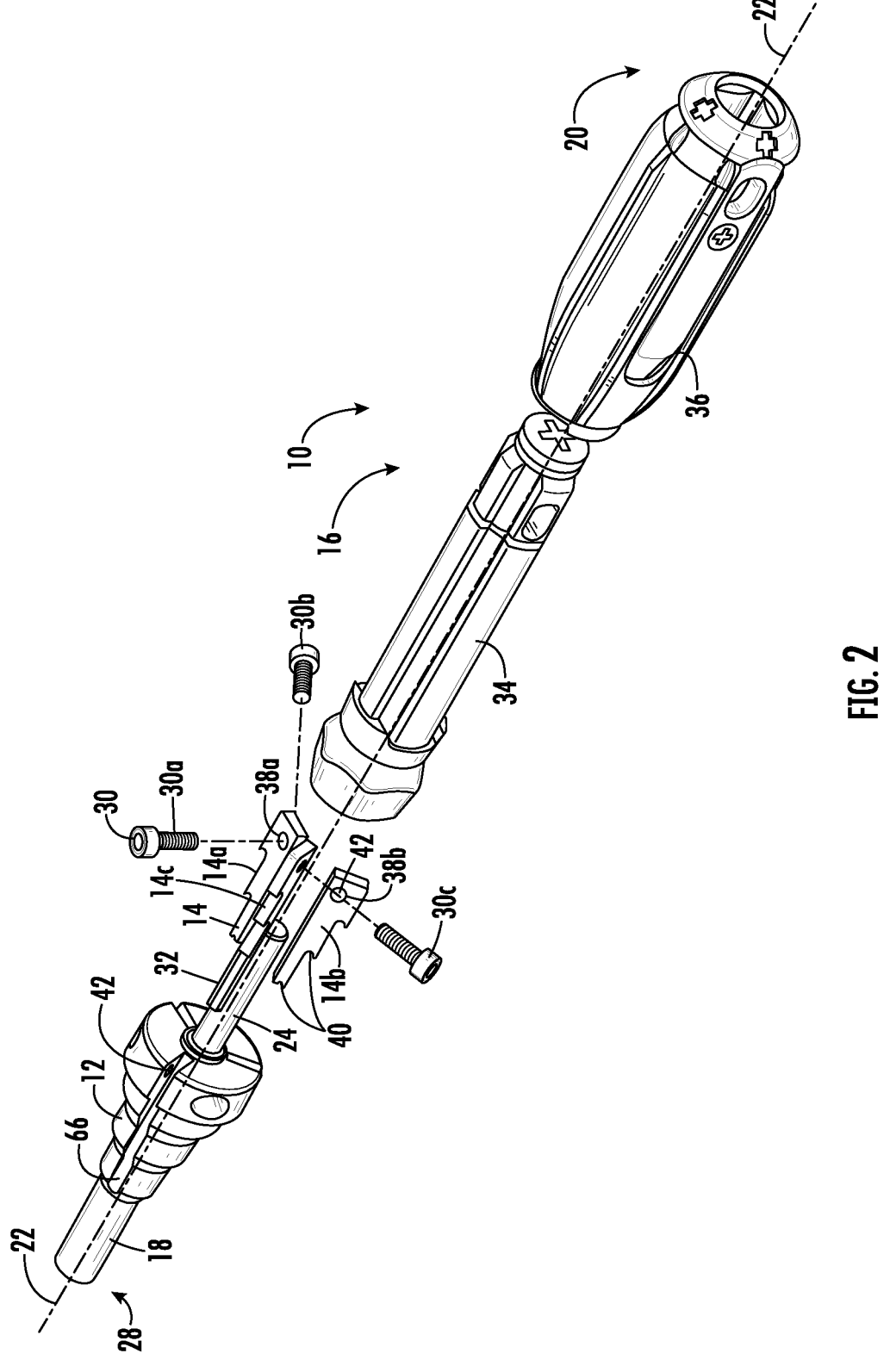
FIG. 2 is an exploded view of the conduit reamer of FIG. 1, according to an exemplary embodiment.

FIG. 2 is an exploded view of conduit reamer 10. In this view, internal parts of bit retainer 12 and handle 16 are shown. For example, bit retainer 12 includes shank 24 that interchangeably couples to handle 16 or a power tool, such as a drill. In other words, shank 24 couples to either a power tool or handle 16 to rotate bit 14 and deburr conduit 26. Shank 24 includes protrusions 32 to securely couple shank 24 within handle 16 or the chuck of a drill. Handle 16 comprises an internal shaft 34 and an exterior cover 36. In some embodiments, internal shaft 34 is a metal material (e.g., steel) and cover 36 is a rubber, plastic, and/or fabric material. In this way, cover 36 makes handle ergonomically for a user, and internal shaft 34 enhances the structural rigidity of handle 16 to ensure that the rotational energy input at handle 16 is transmitted to bit retainer 12 and/or socket 18.

Openings, holes, or fastener locations 38 on each bit 14 receive bit fasteners 30 and secure notches 40 of bit 14 within bit retainer 12. In various embodiments, bit fasteners 30 pass through bits 14 and threadably couple with threads 42 in bit retainer 12, and/or bit fasteners 30 threadedly couple with threads 42 in each bit 14.

Figure 3:
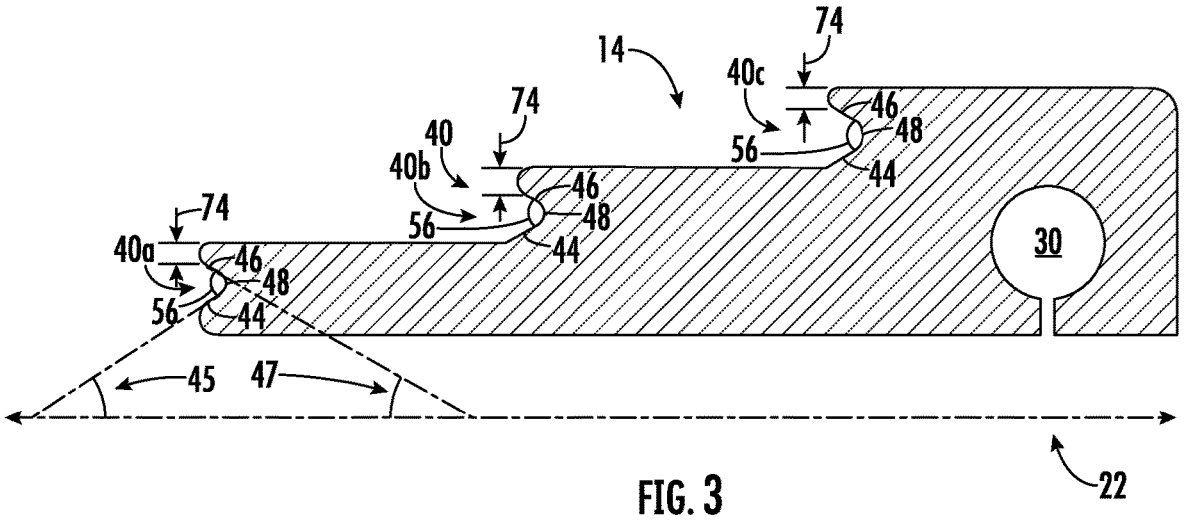
FIG. 3 is a detailed view of a bit, according to an exemplary embodiment.

With reference to FIGS. 2-4, bit 14 has three notches 40 or locations for reaming a conduit 26. In various embodiments, bit 14 includes two or three notches 40, each including an inner blade and an outer blade, and each notch 40 can ream different sized diameters of pipe or conduit 26 because each notch 40 defines a different radii from each other with respect to the longitudinal axis. FIG. 3 is a detailed view of bit 14 showing a pair of cutting edges, specifically inner cutting blade 44 and an outer cutting blade 46 of each notch 40 deburrs conduit 26. Bit 14 includes an arcuate radius or recess 48 in notch 40 between inner cutting blade 44 and outer cutting blade 46. Stated differently, each notch 40 has inner and outer cutting blades 44 and 46 that cut both an inner diameter 50 and an outer diameter 52 of conduit 26. Each notch 40 has a different radius (e.g., arcuate recess 48) coupling inner and outer cutting blades 44 and 46.

As will be described in greater detail below, arcuate recess 48 enhances pouchability and decreases the depth or recess distance 54 of each notch 40. Arcuate recess 48 is between inner and outer cutting blades 44 and 46. The inner blade 44 extends radially inwards from the recess 48 with respect to the longitudinal axis, and the outer blade 46 extends radially outwards from the recess 48 with respect to the longitudinal axis. Arcuate recess 48 also enables an acute opening angle 56 formed between inner cutting blade 44 and outer cutting blade 46 to be within 45 degrees and 90 degrees. As used herein, acute means less than or equal to 90 degrees. In various embodiments, opening angle 56 formed between inner cutting blade 44 and outer cutting blade 46 is acute and greater than 50 degrees with respect to the inner cutting blade 44, and more specifically between 50 degrees and 90 degrees, more specifically between 55 degrees and 80 degrees, and specifically between 60 degrees and 70 degrees. In one embodiment, opening angle 56 is between 60 degrees and 90 degrees. In some embodiments, bit retainer 12 includes various indicia markings 58 (FIG. 5) for opening angle 56, various conduit diameters (e.g., inner and/or outer diameters 50 and/or 52), and/or recess distance 54. Referring to FIG. 3, in a specific embodiment, inner cutting blade 44 defines an acute angle 45 with respect to axial axis 22 and outer cutting blade 46 defines an acute angle 47 with respect to axial axis 22. In a specific embodiment, one or more of angle 45 and angle 47 are between 22.5 degrees and 45 degrees, and more specifically are between 25 degrees and 45 degrees, and more specifically between 27.5 degrees and 40 degrees, and more specifically between 30 degrees and 35 degrees. In one embodiment, angle 45 and/or angle 47 is between 30 degrees and 45 degrees. In various embodiments, each of inner cutting blades 44 and outer cutting blades 46 define the angles with respect to axial axis 22 as recited herein.

FIG. 4 is a detailed view of a pipe or conduit 26 with inner diameter 50 and outer diameter 52 terminating on edge 60. For example, a thickness (e.g., the difference between inner and outer diameters 50 and 52) of conduit 26 separates inner diameter 50 from outer diameter 52. Conduit reamer 10 includes bits 14 with notches 40 having inner cutting blade 44 and outer cutting blade 46. Inner cutting blade 44 couples to inner diameter 50 and outer cutting blade 46 couples to outer diameter 52 of conduit 26. Inner and outer cutting blades 44 and 46 deburr edge 60 and inner and outer diameters 50 and 52.

Figures 5, 6:
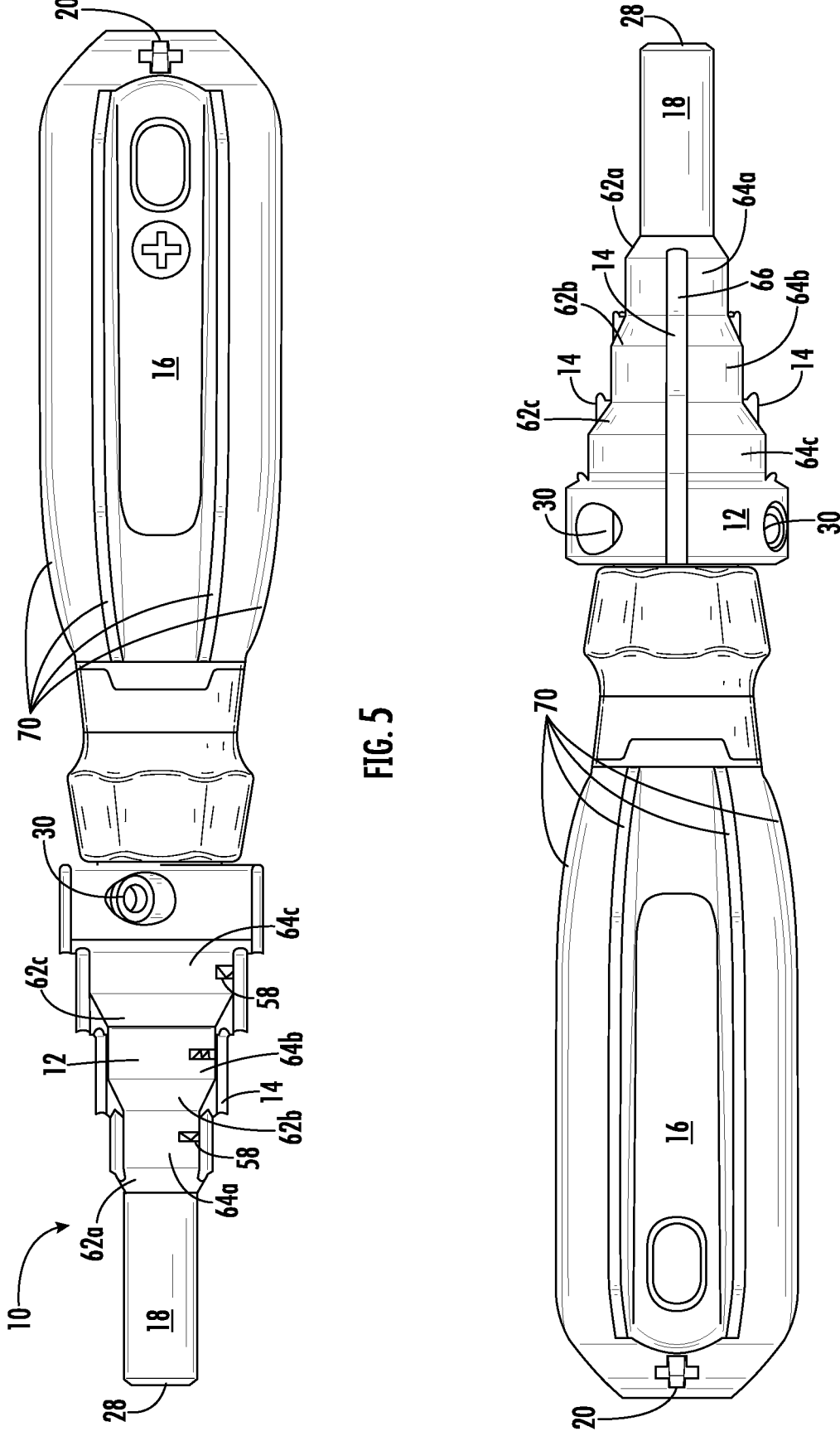
FIG. 5 is a first side view of the conduit reamer, according to an exemplary embodiment.
FIG. 6 is a second side view, opposite the first side view of FIG. 5, of the conduit reamer, according to an exemplary embodiment.

FIGS. 5 and 6 show opposite side views of conduit reamer 10 with three notches 40 and three bits 14. For example, FIG. 5 shows a first side view of conduit reamer 10, and FIG. 6 shows a second side view, opposite the first side view of FIG. 5. As shown in FIGS. 5 and 6, two or more bits 14 are coupled to bit retainer 12 and evenly circumferentially spaced about bit retainer 12 with respect to the longitudinal axis (e.g., every 120 degrees). FIG. 5 shows indicia markings 58 for a ½ inch, ¾ inch, and 1-inch diameter conduit 26. Bit retainer 12 has an angled surface 62 and an orienting surface 64 for each diameter of conduit 26.

For example, notch 40$_a$ for the ½ inch conduit 26 has angled surface 62$_a$ that orients inner diameter 50 of a ½ inch conduit 26 about orienting surface 64$_a$. Similarly, notch 40$_b$ for the ¾ inch conduit 26 has angled surface 62$_b$ and orienting surface 64$_b$. In this case, angled surface 62$_b$ is too large for a smaller diameter conduit 26 (e.g., ½ inch conduit 26), but has notch 40$_a$ extending through angled surface 62$_b$, such that a larger inner diameter 50 conduit 26 (e.g., a ¾ inch or 1-inch conduit 26) passes over notch 40$_a$ and angled surface 62$_b$. Similarly, notch 40$_c$ for the 1-inch conduit 26 has an angled surface 62$_c$ and an orienting surface 62$_c$ to orient inner diameter 50 and outer diameter 52 of 1-inch conduit 26 within inner cutting blade 44 and outer cutting blade 46 of notch 40$_c$.

Figure 7:
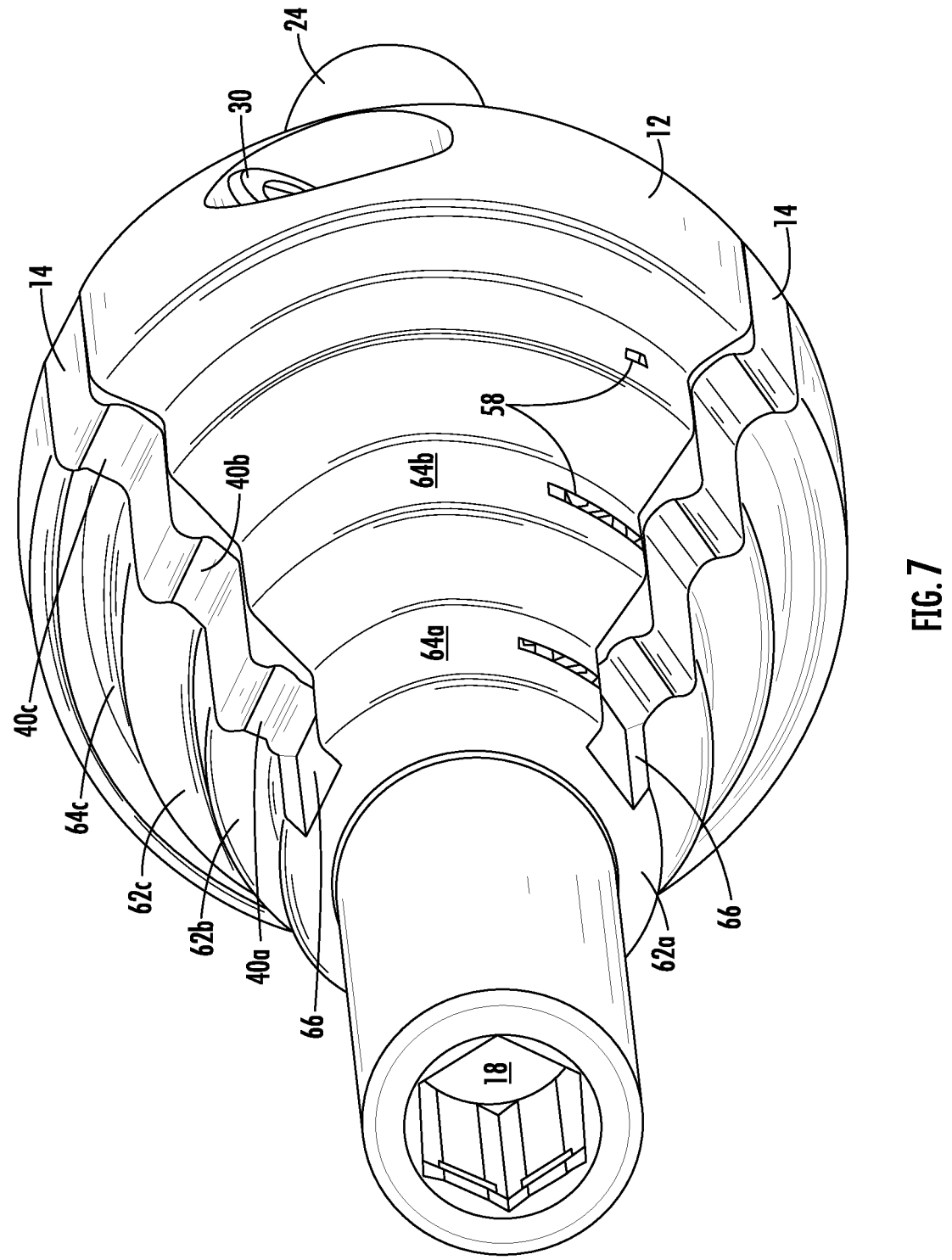
FIG. 7 is a perspective view of a bit retainer supporting three bits, according to an exemplary embodiment.

FIG. 7 is a perspective view of bit retainer 12 supporting three bits 14 evenly spaced about axial axis 22 (e.g., every 120 degrees). Shank 24 couples either to handle 16 of a hand tool or a chuck of a drill or other power tool. Three-bit fasteners 30 secure each bit 14 within a channel 66 of bit retainer 12 to releasably couple bit 14 in bit retainer 12. Bit fasteners 30 are removed and/or loosened to remove bit 14 and tightening bit fasteners 30 secures bit 14 within channel 66. In some embodiments, channel 66 forms a friction fit with bit 14.

FIG. 7 shows socket 18 as a hex or Torx fastener, e.g., for a hex nut. Socket 18 enables bit retainer 12 to rotate to secure or loosen a fastener, e.g., like a screwdriver. In some embodiments, socket 18 includes a ratchet 68 (FIGS. 1 and 2), which enables an operator to fix rotation in one direction but allow free rotation in the opposite direction. For example, in a first mode, the operator rotates socket 18 in a clockwise direction to tighten a fastener, but rotation in a counter-clockwise direction does not loosen the fastener. When the operator switches the orientation into a second mode, rotation in a counter-clockwise direction loosens the fastener, but rotation in a clockwise direction does not tighten the fastener.

Ratchet 68 is locked in socket 18 and rotated to tighten or loosen a fastener. For example, socket 18 couples to ratchet 68 on bit retainer 12. In some embodiments, socket 18 partially surrounds bit 14 to further secure bit 14 on bit retainer 12.

Figure 8:
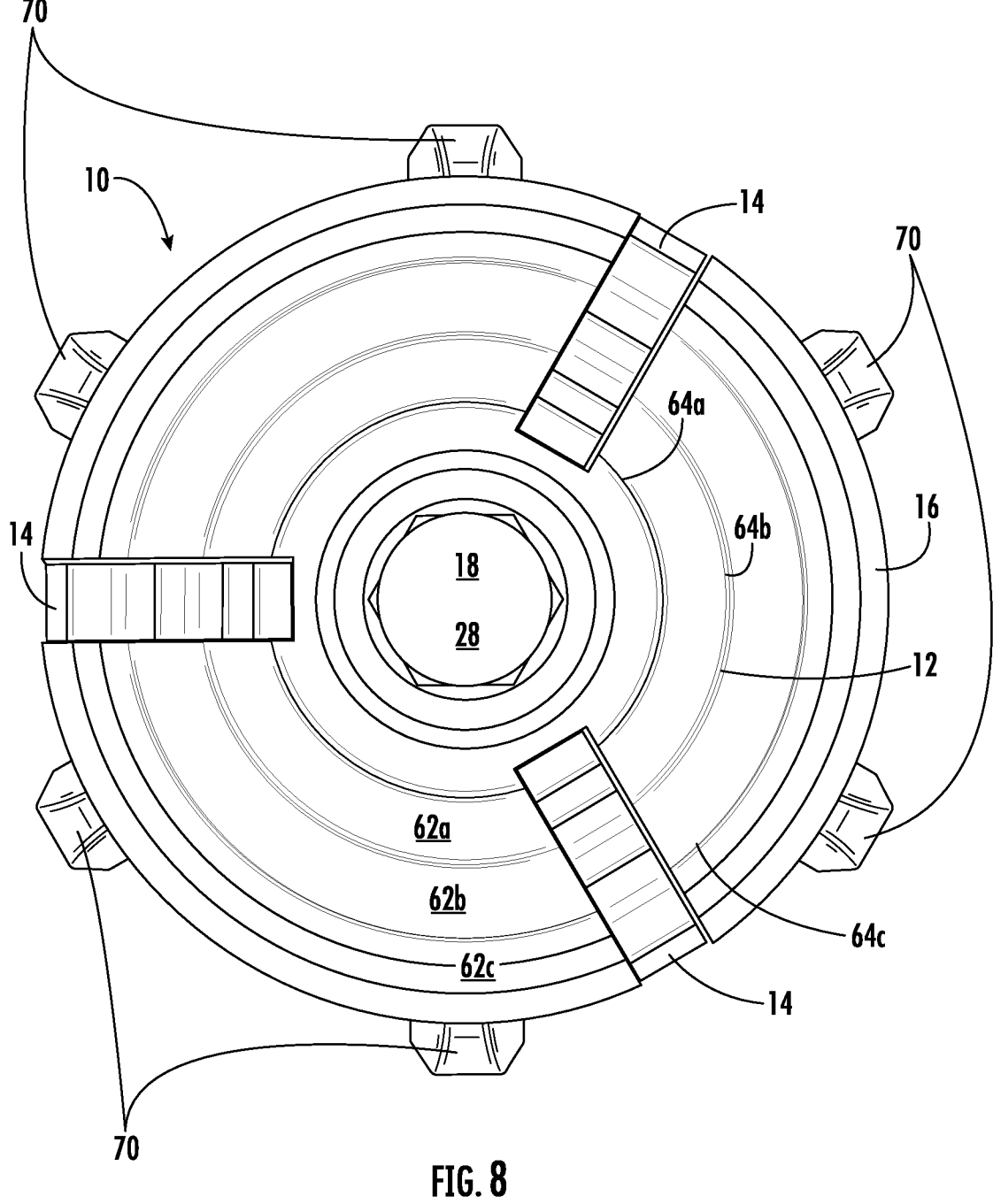
FIG. 8 is a top view of the bit retainer of FIG. 7 with installed bits and coupled to the handle, according to an exemplary embodiment.

FIG. 8 is a top view of bit retainer 12. Three bits 14 are installed and coupled to bit retainer 12, which is coupled to handle 16. Three angled surfaces 62 are visible showing different sized notches with inner cutting blades 44, outer cutting blades 46, and arcuate surfaces or recesses 48 oriented about each orienting surface 64. In some embodiments, clockwise inner and/or outer cutting blades 44 and/or 46 on bit retainer 12 rotate in a clockwise feed direction about conduit 26 to deburr edges 60 of conduit 26. Similarly, counter-clockwise inner and/or outer cutting blades 44 and/or 46 rotate in a counter-clockwise feed direction about conduit 26 to deburr edges 60 of conduit 26. Socket 18 is shown configured to fasten a hex-nut, and grips 70 on handle 16 are also visible. Grips 70 increase the operators grip and result in enhancing the torque the operator applies to socket 18 and/or bit 14 of bit retainer 12.

In various embodiments, conduit reamer 10 includes a first bit 14$_a$, a second bit 14$_b$, and/or a third bit 14$_g$. Each bit has a first notch 40$_a$, a second notch 40$_b$, and/or a third notch 40$_g$. Each notch 40 includes inner cutting blade 44, outer cutting blade 46, and/or forms an acute opening angle 56 and/or recess distance 54 between inner cutting blade 44 and outer cutting blade 46 of each notch 40. Each notch deburrs edges 60 of different sized conduit 26, including inner diameter 50 and/or outer diameter 52 and/or edges 60. Specifically, each conduit 26 has different materials and/or diameters (e.g., inner and/or outer diameters 50 and/or 52).

Figures 9, 10, 11, 12:
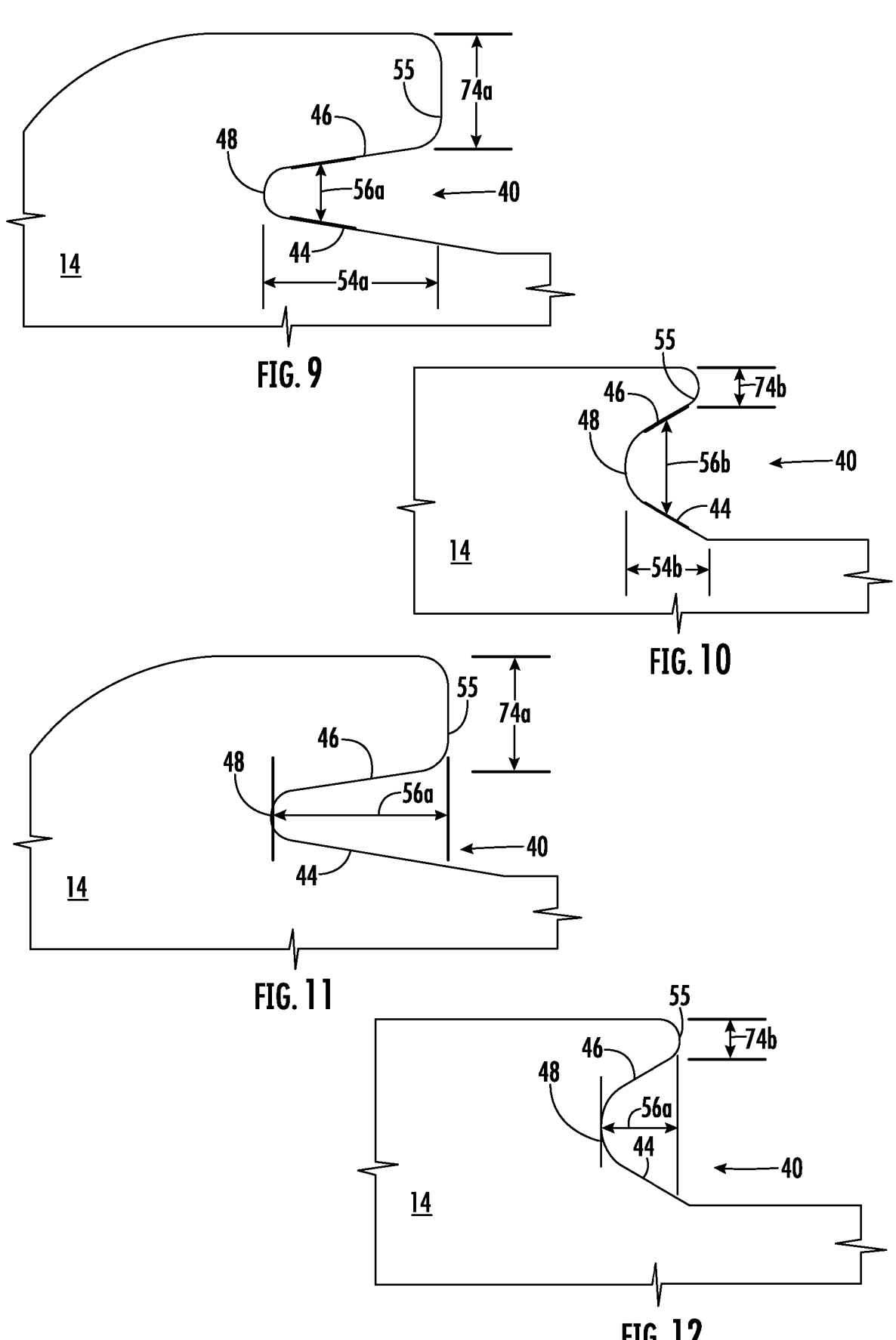
FIG. 9 is a detailed view of a notch on the bit having inner and outer blades oriented at an acute angle of 15 degrees to 25 degrees, according to an exemplary embodiment.
FIG. 10 is a detailed view of a notch on the bit having inner and outer blades oriented at an acute angle of 45 degrees to 90 degrees, according to an exemplary embodiment.
FIG. 11 is a detailed view of the notch of FIG. 8 showing an elongated cutting blade distance on the bit having inner and outer blades oriented at an angle of 15 degrees to 25 degrees, according to an exemplary embodiment.
FIG. 12 is a detailed view of the notch of FIG. 10, showing a shortened cutting blade distance on the bit having inner and outer blades oriented at an angle of 45 degrees to 90 degrees, according to an exemplary embodiment.
Figure 13:
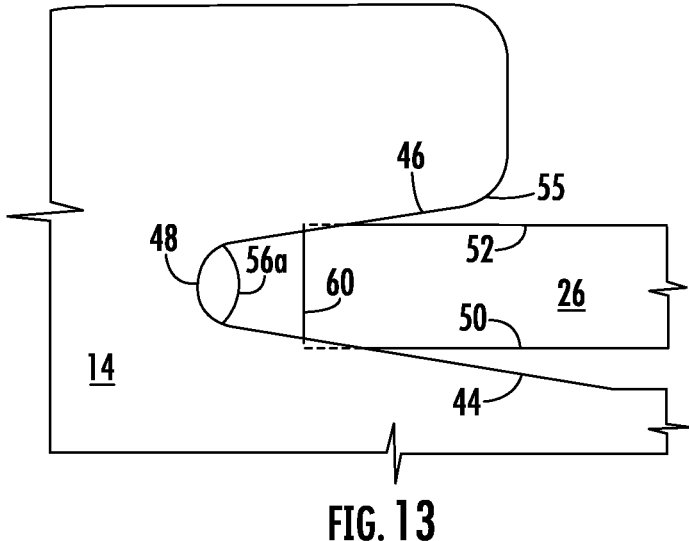
FIG. 13 is a detailed view of a conduit edge in the notch of FIG. 9 showing the deburred material on the inner and outer diameters of the conduit, according to an exemplary embodiment.
Figure 14:
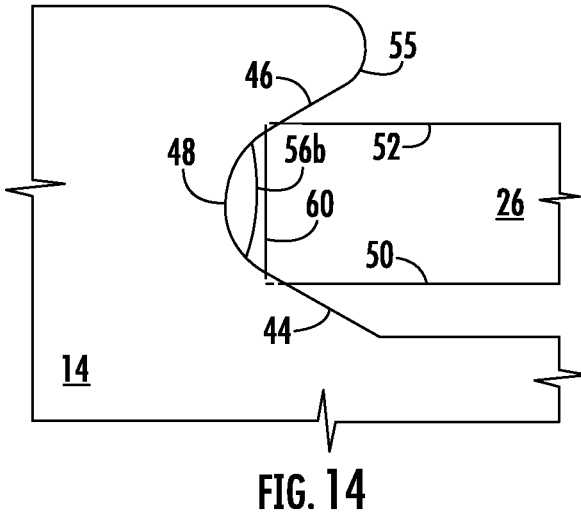
FIG. 14 is a detailed view of a conduit edge in the notch of FIG. 10, showing the deburred material on the inner and outer diameters of the conduit, according to an exemplary embodiment.

FIGS. 9-14 show two different opening angles 56 in notches 40. For example, a narrow opening angle 56$_a$ is compared to a wide opening angle 56. In some embodiments, notch 40 has a narrow opening angle 56$_a$, and in other embodiments, notch 40 has a wide opening angle 56$_b$. FIGS. 9 and 10 compare narrow opening angle 56$_a$ (FIG. 9) with wide opening angle 56$_b$ (FIG. 10). FIGS. 11 and 12 compare depths or recess distances 54 of narrow opening angle 56$_a$ to wide opening angle 56$_b$. For example, a recess distance 54$_a$ of a narrow opening angle 56$_a$ is greater than a recess distance 54$_b$ of wide opening angle 56$_b$. FIGS. 13 and 14 compare the function of a narrow opening angle 56$_a$ to a wide opening angle 56$_b$ on inner diameter 50 and/or outer diameter 52 of a conduit 26. FIGS. 13 and 14 illustrate only a cross-section of one wall 72 and/or edge 60 of conduit 26. Specifically, another opposite wall 72 is located opposite the cross-section shown (e.g., on an opposite end of inner diameter 50 and outer diameter 52). For example, FIGS. 1-2 and 5-8 show bit retainer 12 with three bits 14. Each bit 12 has notches 40 that engage edges 60 and/or walls 72 of conduit 26. Notches 40 are spaced 120 degrees on either side of the cross-section shown. Each notch 40 on each bit 14 simultaneously deburrs inner diameter 50 and/or outer diameter 52 of edges 60 and/or wall 7.

FIGS. 9 and 10 show two notches 40 with narrow opening angle 56$_a$ (FIG. 9) and wide opening angle 56$_b$ (FIG. 10). Specifically, FIG. 9 is a detailed view of notch 40 on bit 14 having inner cutting blade 44 and outer cutting blade 46 oriented at an acute opening angle 56 of between 15 degrees to 25 degrees, more specifically, FIG. 9 shows a 20-degree narrow opening angle 56$_a$. Similarly, FIG. 10 shows a detailed view of notch 40 having inner cutting blade 44 and outer cutting blade oriented at an acute opening angle 56$_b$ of between 45 degrees to 90 degrees, more specifically, FIG. 10 shows a wide 61-degree opening angle 56$_b$.

FIGS. 11 and 12 compare narrow opening angle 56$_a$ (FIG. 11) with wide opening angle 56$_b$ (FIG. 12). Recess distance 54 of the opening between cutting blades 44 and 46 is a measure from a leading-edge 60 of outer cutting blade 46 to arcuate recess 48. FIG. 11 is a detailed view showing an elongated cutting blade recess distance 54$_a$ on bit 14 with narrow opening angle 56$_a$ with inner cutting blade 44 oriented at an angle of 15 degrees to 25 degrees relative to outer cutting blade 46.

FIG. 12 is a detailed view showing a shortened cutting blade recess distance 54$_b$ on bit 14 and inner cutting blade 44 with an acute wide opening angle 56 of between 45 degrees to 90 degrees relative to outer cutting blade 46. In various embodiments, elongated cutting blade recess distance 54$_a$ of FIG. 11 is between 3 mm and 5 mm, specifically between 3.5 mm and 4 mm. In various embodiments, recess 48 defines a depth and/or a shortened cutting blade recess distance 54$_b$ that is between 0.5 mm and 2 mm, specifically between 0.75 mm and 1.75 mm, and more specifically between 1 mm and 1.5 mm.

In some embodiments, shortened cutting blade recess distance 54$_b$ enhances pouchability (illustrated in FIGS. 11 and 12) and/or effectiveness (illustrated in FIGS. 13 and 14) of inner cutting blade 44 and/or outer cutting blade 46. Acute wide opening angles 56$_b$ (FIG. 12) result in a shortened cutting blade recess distance 54$_b$ (e.g., depth) between a hook formed by leading edge 55 and arcuate recess 48. The shortened cutting blade recess distance 54 and thickness 74 results in a narrower outer cutting blade 46 to cover equivalent variations of conduit outer diameters. Acute wide opening angles 56$_b$ use a smaller thickness 74$_b$ to obtain equivalent opening distances for a variety of pipe thicknesses between leading edge 55 of outer cutting blade 46 and inner cutting blade 44 as narrow opening angles 56$_a$. For example, thickness 74$_a$ is greater than thickness 74$_b$. The reduced thickness 74$_b$ and/or shortened cutting blade recess distance 54$_b$ of acute wide opening angles 56 results in enhanced pouchability, by reducing the tendency of bit 14 (inner and/or outer cutting blades 44 and/or 46) getting caught or snared on fabric pockets and/or pouches. Thus, acute wide opening angles 56$_b$ result in shortened cutting blade recess distances 54$_b$ and/or reduced thicknesses 74$_b$ of outer cutting blade 46 to enhance pouchability.

FIGS. 13 and 14 illustrate the resulting effectiveness of acute wide opening angles 56$_b$ on conduit edge 60 in notch 40. Wide opening angles 56$_b$ focus on removing deburred material on edges 60 of inner diameter 50 and outer diameter 52 of deburred conduit 26. Wide opening angles 56$_b$ result in more efficient inner and outer cutting blades 44 and 46 that contact burrs on edges 60 of conduit 26. For example, when an operator cuts conduit 26, burrs generally develop on the cut face or edge 60 and/or on inner or outer diameter of conduit 26 near edge 60.

FIG. 13 shows conduit edge 60 in a narrow notch 40$_a$ (e.g., having a narrow opening angle 56$_a$). FIG. 14 is a detailed view of conduit edge 60 in a wide notch 40$_b$ (e.g., having a wide opening angle 56$_b$). FIG. 14 shows inner cutting blade 44 and outer cutting blade 46 more accurately deburring material on inner diameter 50 and outer diameter 52 along edge 60 of conduit 26. In contrast, FIG. 13 shows inner cutting blade 44 and outer cutting blade 46 removing material on inner diameter 50 and outer diameter 52 further away from edge 60 of conduit 26.

FIGS. 9, 11, and 13 show narrow opening angles 56$_a$ that result in increased torsional input from the operator to remove excess material from inner diameter 50 and outer diameter 52 of conduit 26. In addition, narrow opening angles 56$_a$ can generate new burrs and/or chips on edge 60 of conduit 26. Narrow opening angles 56$_a$ are more sensitive to variations in conduit 26 thicknesses. For example, when notch 40 with narrow opening angle 56$_a$ reaches seam 76 (FIG. 4) of conduit 26, inner cutting blade 44 and outer cutting blade 46 use increased torsional input for deburring the thicker seam 76 than wide opening angle 56$_b$ (FIGS. 10, 12, and 14).

FIG. 14 shows how wide opening angle 56$_b$ engages inner and outer diameters 50 and 52 of conduit 26 at edge 60 to remove burrs and chips and deburr conduit 26 more evenly. In this way, inner and outer cutting blades 44 and 46 of bit 14 engage and remove burrs with less excess material removed from conduit 26 than a similar bit 14 with narrow opening angle 56$_a$. This reduces operator torsional input and improves the efficiency of conduit reamer 10 to deburr edges 60 and/or reduce catching seam 76 on inner and/or outer cutting blade 46 and/or 48. In some embodiments, the increased efficiency of wide opening angle 56$_b$ facilitates multiple bits 14 (e.g., two, three, four, or more bits 14) within bit retainer 12 because of the reduced operator torsional input at each bit 14.

Figure 15:
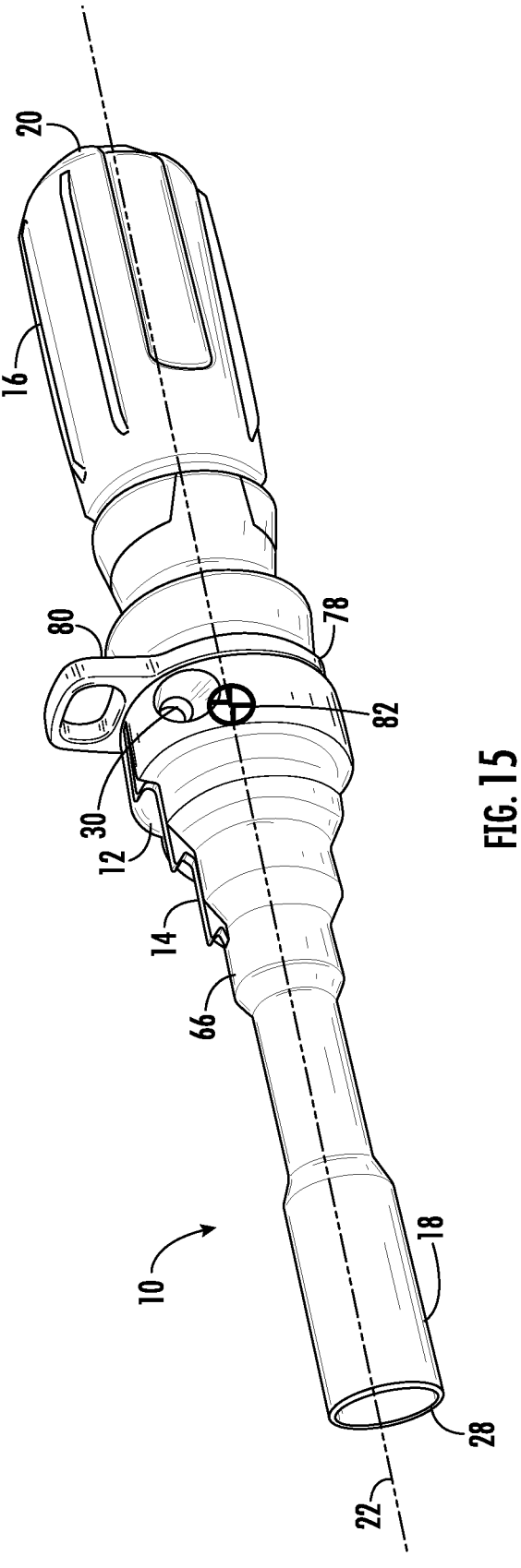
FIG. 15 is a perspective view of a conduit reamer with a lanyard receiver located in a slot between the handle and the bit retainer, according to an exemplary embodiment.

FIG. 15 is a perspective view of another embodiment of a conduit reamer 10 with a slot 78 locating a lanyard receiver 80 coupled to conduit reamer 10 between handle 16 and bit retainer 12. Similarly, lanyard receiver 80 is located in slot 78 between handle 16 and bit retainer 12. Stated differently, slot 78 receives lanyard receiver 80 at a location near a center of gravity 82 of conduit reamer 10 along axial axis 22. For example, slot 78 and/or lanyard receiver 80 are located within 10% of a total length (measured from first end 20 to second end 28) of conduit reamer 10 relative to center of gravity 82 on axial axis 22. For example, if the total length is ten inches and center of gravity 82 along axial axis 22 is 6 inches from first end 20, then slot 78 and/or lanyard receiver 80 are located between 5 inches and 7 inches from first end 20. In various embodiments, slot 78 and/or lanyard receiver 80 are located within 10% of center of gravity 82, specifically within 7.5%, and more specifically within 5% of the total length from center of gravity 82 measured along axial axis 22 in either direction from center of gravity 82.

In some embodiments, slot 78 and/or lanyard receiver 80 are located closer to second end 28 of bit retainer 12 than first end 20 of handle 16. For example, bit retainer 12 is heavier than handle 16 and shifts center of gravity 82 along axial axis 22 nearer to second end 28, such that slot 78 and/or lanyard receiver 80 are located nearer the second end 28 than the first end 20. In various embodiments, slot 78 and/or lanyard receiver 80 are located within 15%, 20%, 25%, 30%, 35%, 40%, 45%, or less of the total length as measured from second end 28. For example, slot 78 and/or lanyard receiver 80 are located between second end 28 and center of gravity 82 to prevent downward rotation of bits 14 when conduit reamer 10 is dropped.

Figure 16:
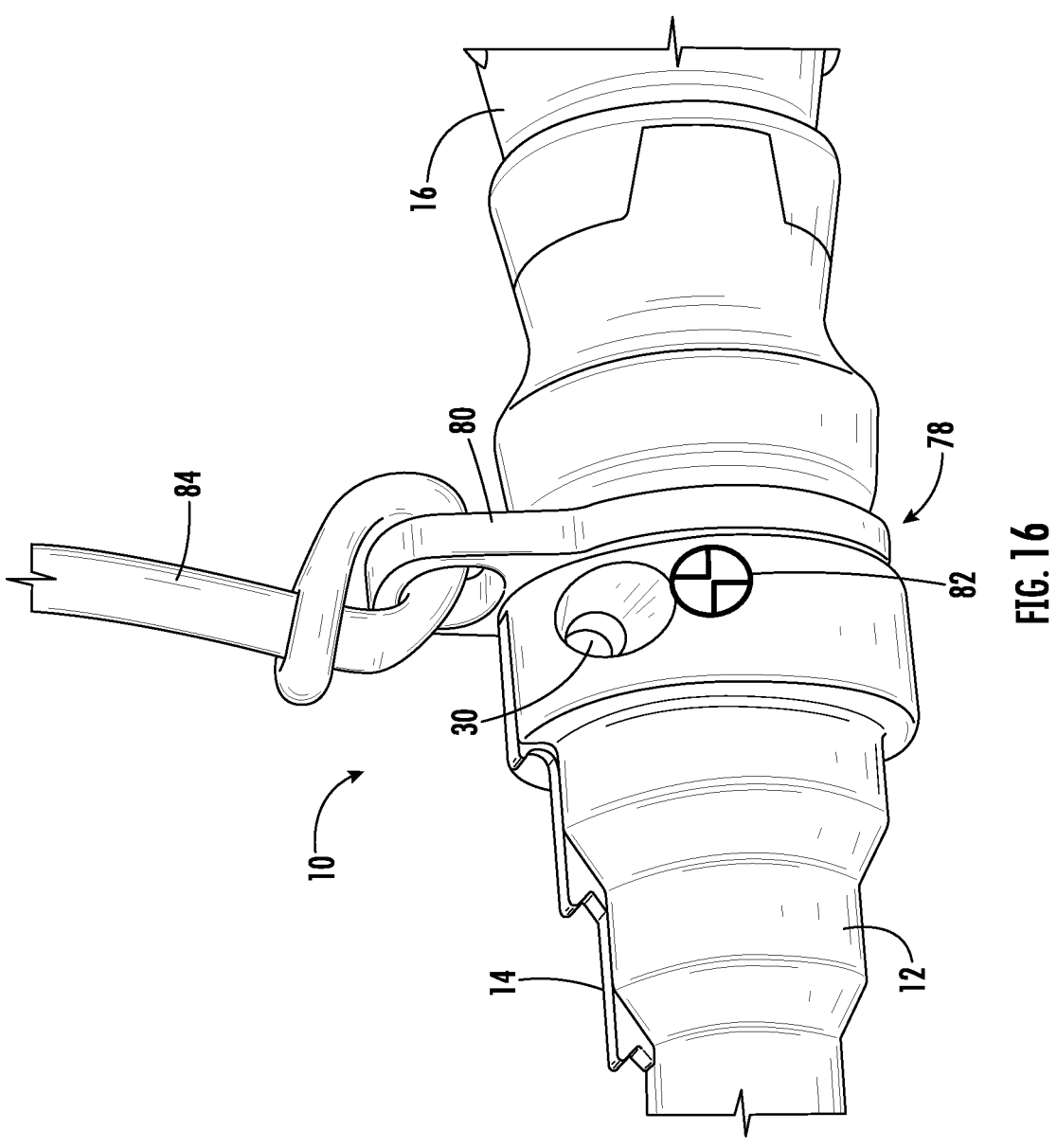
FIG. 16 is a detailed perspective view of the bit retainer, lanyard receiver, and handle, showing a lanyard coupled to the lanyard receiver, according to an exemplary embodiment.

FIG. 16 is a detailed perspective view of bit retainer 12, lanyard receiver 80, and handle 16, which shows a lanyard 84 coupled to lanyard receiver 80. For example, lanyard receiver 80 is configured to securely by removably couple lanyard 84 to conduit reamer 10. In some embodiments, lanyard receiver 80 is removably coupled to handle 16, slot 78, and/or bit retainer 12. In some embodiments, lanyard receiver 80 includes a metal, nylon, polymer, plastic (thermoset or thermoplastic), and/or rubber material. In some embodiments, lanyard receiver 80 includes a pin 86 (FIG. 17) extending across slot 78, such that lanyard 84 couples around pin 86 between handle 16 and bit retainer 12. Stated different, pin 86 forms a lanyard receiver with slot 78 and/or another insert 88 on handle 16.

Figure 17:
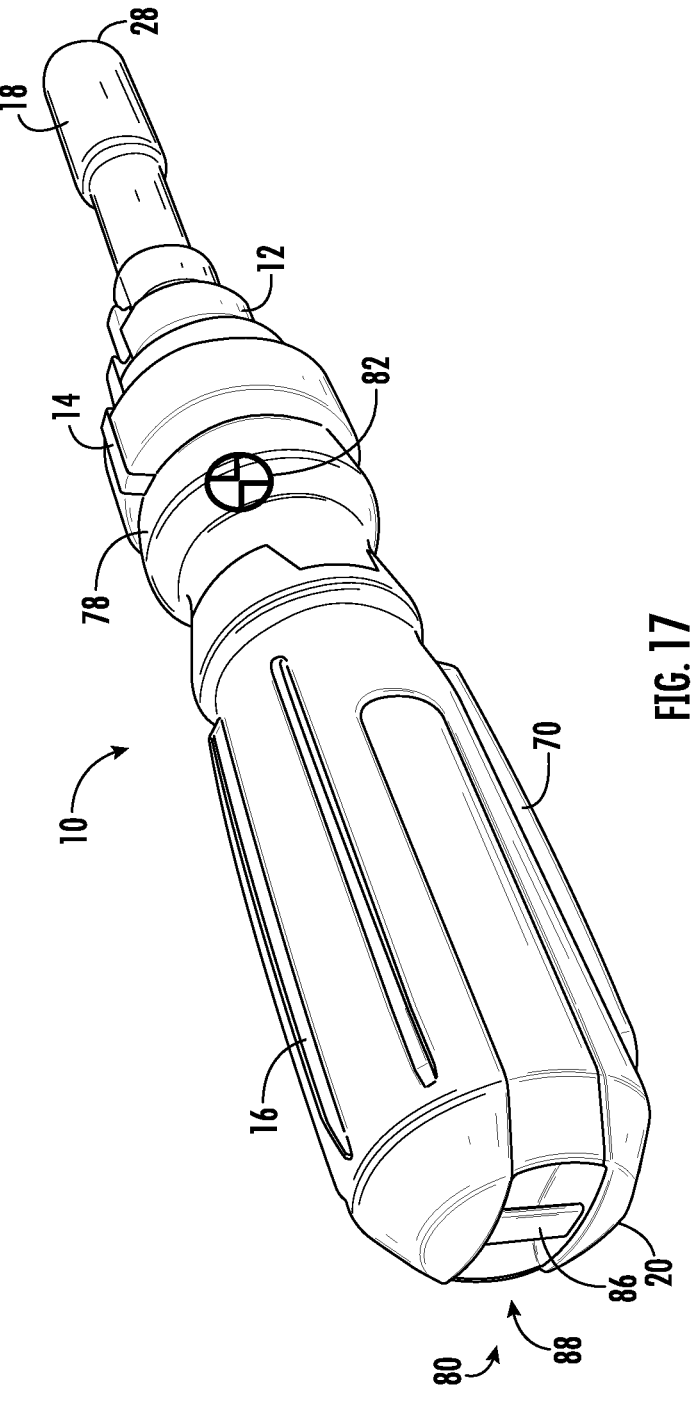
FIG. 17 is a side perspective view of a back of the handle showing a lanyard receiver formed from a pin spanning across an insert in the handle, according to an exemplary embodiment.
Figure 19:
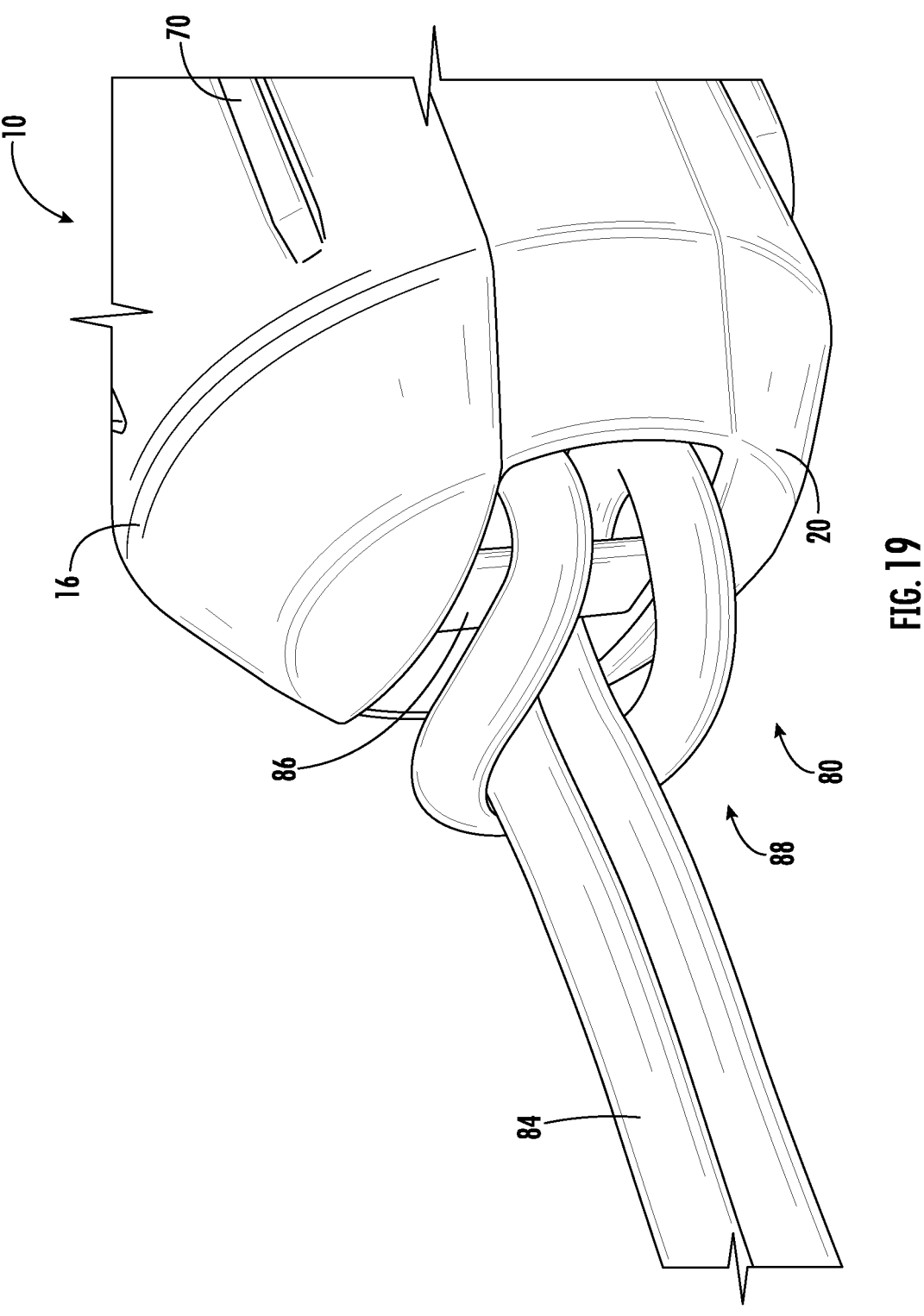
FIG. 19 shows the lanyard receiver of FIG. 17 coupled to a lanyard, according to an exemplary embodiment.

FIG. 17 is a side perspective view of a back (e.g., first end 20) of handle 16 to show lanyard receiver 80 formed from pin 86 spanning across an insert 88 of handle 16. For example, conduit reamer has a first lanyard receiver 80 (FIG. 16) in slot 78 and a second lanyard receiver on first end 20 of handle 16. The second lanyard receiver 80 further includes an insert 88 within first end 20 of handle 16. Insert 88 has pin 86 spanning across insert 88. Insert 88 and pin 86 cooperate to form second lanyard receiver 80 to securely attach lanyard 84 (FIG. 19).

Figure 18:
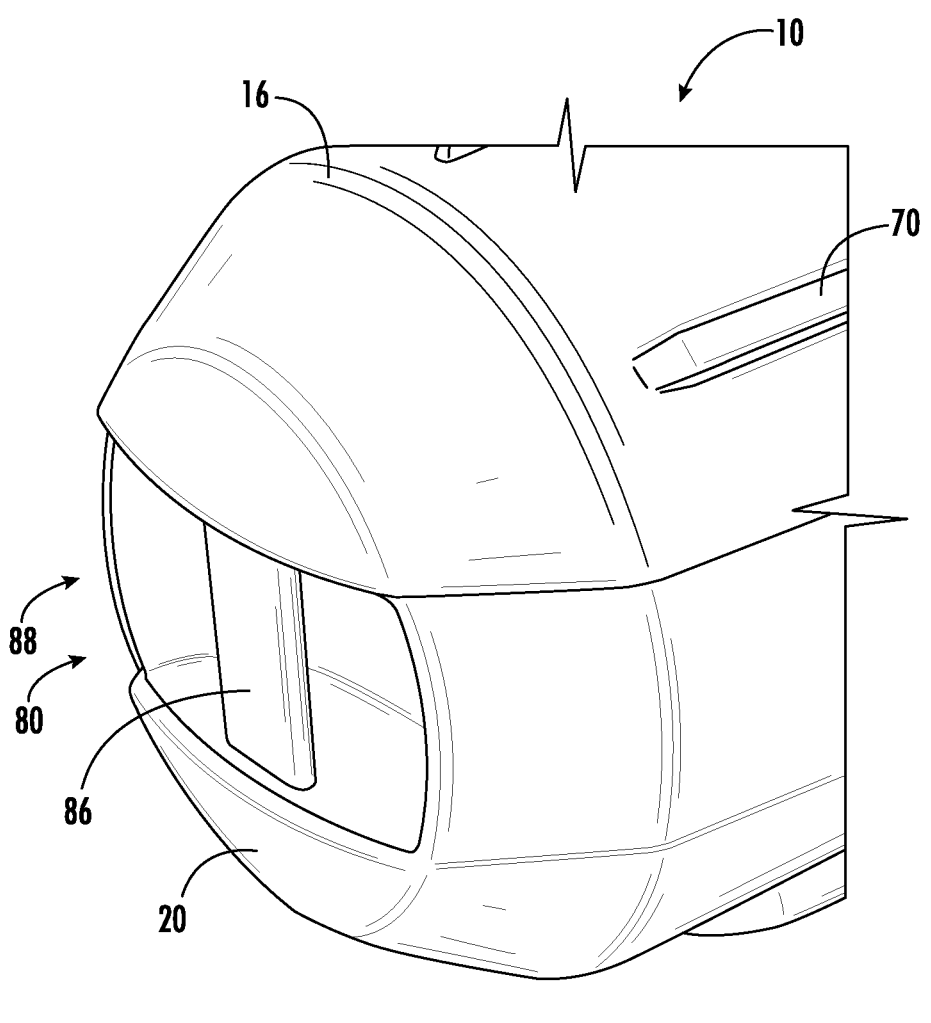
FIG. 18 is an enlarged view of the lanyard receiver of FIG. 17, according to an exemplary embodiment.

FIG. 18 is an enlarged view of lanyard receiver 80, showing insert 88 and pin 86 at first end 20 of handle 16. FIG. 19 shows lanyard receiver 80 coupled to lanyard 84. As shown in FIG. 19, lanyard 84 loops through insert 88 and around pin 86 to couple lanyard to first end 20 of handle 16 and secure conduit reamer 10 to lanyard 84.

Figure 20:
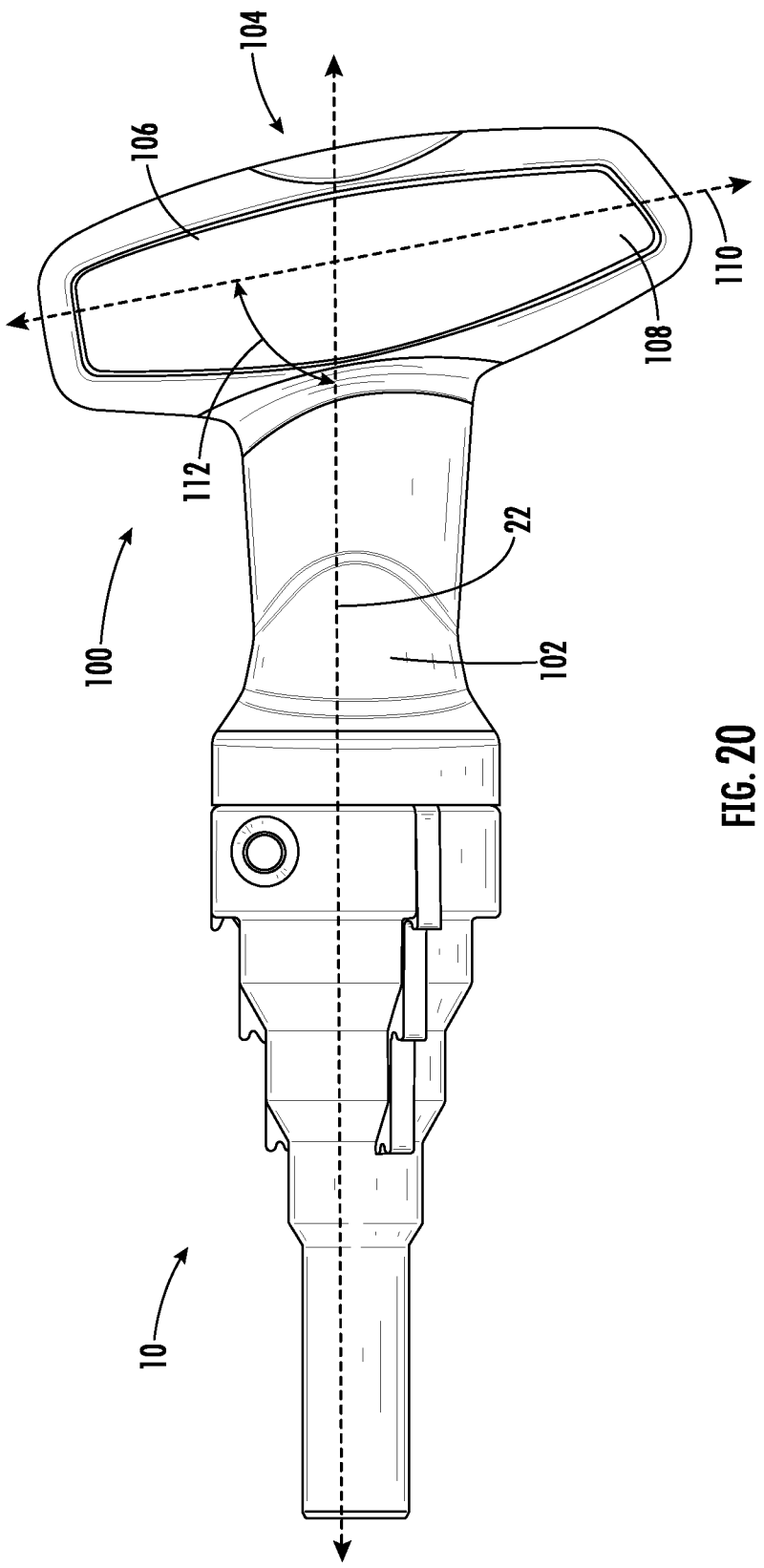
FIG. 20 shows a conduit reamer having a handle, according to another exemplary embodiment.

Referring to FIG. 20, conduit reamer 10 is show including a handle 100, according to another exemplary embodiment. In contrast to the generally axially aligned handle 16 discussed above, handle 100 includes a shaft portion 102 that extends along and is generally aligned with longitudinal axis 22 and an end portion 104 that extends away from shaft portion 102.

In general, end portion 104 is coupled to an outer end (e.g., the end away from the cutting end of conduit reamer 10) of shaft portion 102 and extends away from both sides of shaft portion 102 in a direction away from longitudinal axis 22. In this manner, end portion 104 has a dimension (e.g., a width dimension) perpendicular to axis 22 that is greater than (e.g., greater than 2×, or greater than 3×) the width dimension of shaft portion 102. Applicant believes this design provides an enlarged cross-sectional area that is believed to improve holding and twisting by the user.

In a particular embodiment as shown in FIG. 20, end portion 104 includes a first section 106 that extends from shaft portion 102 in a first direction away from axis 22 and a second section 108 that extends from shaft portion 102 in a second direction, opposite of the first direction, away from axis 22. In this embodiment, end portion 104 defines an axis 110 that generally bisects end portion 104 and that defines a non-perpendicular interior angle 112 with axis 22. In general, interior angle 112 is less than 90 degrees such that first section 106 is angled toward the front of conduit reamer 10 and second section 108 is angled in the opposite direction away from the front of conduit reamer 10. In specific embodiments, angle 112 is greater than 45 degrees and less than 90 degrees. Applicant believes that this handle design provides improved ergonomics and allows the user to apply greater torque to the conduit reamer 10 with less fatigue as compared to at least some axially aligned handle designs.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths, and radii, as shown in the Figures, are to scale. Actual measurements of the Figures will disclose relative dimensions, angles, and proportions of the various exemplary embodiments. Various exemplary embodiments extend to various ranges around the absolute and relative dimensions, angles, and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A conduit reamer, comprising:
a handle extending along a longitudinal axis and defining a first end of the conduit reamer;
a bit retainer coupled to the handle and defining a second end of the conduit reamer opposite the first end;
a lanyard receiver coupled to the conduit reamer and located entirely between the handle and the bit retainer with respect to the longitudinal axis, wherein the lanyard receiver is located within 10% of a center of gravity of the conduit reamer along the longitudinal axis; and
a first bit coupled to the bit retainer, the first bit comprising:
an inner cutting blade;
an outer cutting blade defining an acute angle with respect to the inner cutting blade, wherein the acute angle is greater than 50 degrees, the inner cutting blade extending radially inwards from the outer cutting blade with respect to the longitudinal axis and the outer cutting blade extending radially outwards from the inner cutting blade with respect to the longitudinal axis; and
a recess between the inner cutting blade and the outer cutting blade, the inner cutting blade extending radially inwards from the recess with respect to the longitudinal axis and the outer cutting blade extending radially outwards from the recess with respect to the longitudinal axis.

2. The conduit reamer of claim 1, the first bit comprises a first notch that includes the inner cutting blade and the outer cutting blade, the first bit comprises a second notch and a third notch that each comprise an inner cutting blade and an outer cutting blade, wherein each of the first, second and third notches define distinct radii from each other with respect to the longitudinal axis.

3. The conduit reamer of claim 1, wherein the acute angle is between 60 degrees and 70 degrees.

4. The conduit reamer of claim 1, further comprising a second bit that comprises a second inner cutting blade and a second outer cutting blade, wherein the first bit and second bit are circumferentially spaced around the bit retainer with respect to the longitudinal axis.

5. The conduit reamer of claim 4, the first bit comprises a first notch that includes the inner cutting blade and the outer cutting blade, the first bit comprises a second notch and a third notch that each comprise an inner cutting blade and an outer cutting blade, wherein each of the first, second and third notches define distinct radii from each other with respect to the longitudinal axis.

6. The conduit reamer of claim 4, wherein the first bit and second bit are circumferentially spaced 120 degrees from each other around the bit retainer with respect to the longitudinal axis.

7. The conduit reamer of claim 1, wherein the recess defines a depth between 0.5 mm and 2.0 mm.

8. A conduit reamer, comprising:
a handle extending along a longitudinal axis and defining a first end of the conduit reamer;
a bit retainer coupled to the handle and defining a second end of the conduit reamer opposite the first end;
a first bit coupled to the bit retainer, the first bit comprising an inner cutting blade and an outer cutting blade, the inner cutting blade extending radially inwards from the outer cutting blade with respect to the longitudinal axis and the outer cutting blade extending radially outwards from the inner cutting blade with respect to the longitudinal axis; and
a lanyard receiver coupled to the conduit reamer and located entirely between the handle and the bit retainer with respect to the longitudinal axis, wherein the lanyard receiver is located within 10% of a center of gravity of the conduit reamer along the longitudinal axis.

9. The conduit reamer of claim 8, the first bit comprises a first notch that includes the inner cutting blade and the outer cutting blade, the first bit comprises a second notch and a third notch that each comprise an inner cutting blade and an outer cutting blade, wherein each of the first, second and third notches define distinct radii from each other with respect to the longitudinal axis.

10. The conduit reamer of claim 9, the outer cutting blade defines an angle between 22.5 degrees and 45 degrees with respect to the longitudinal axis.

11. The conduit reamer of claim 9, the inner cutting blade defines an angle between 22.5 degrees and 45 degrees with respect to the longitudinal axis.

12. The conduit reamer of claim 8, the inner cutting blade and the outer cutting blade define a recess, wherein the recess defines a depth between 0.5 mm and 2.0 mm.

13. A conduit reamer, comprising:
a handle extending along a longitudinal axis;
a bit retainer coupled to the handle; and
a first bit releasably coupled to the bit retainer such that the first bit is replaceable, the first bit comprising:
an inner cutting blade; and
an outer cutting blade extending radially outwards from the inner cutting blade with respect to the longitudinal axis, the inner cutting blade extending radially inwards from the outer cutting blade with respect to the longitudinal axis, the outer cutting blade defining an angle between 22.5 degrees and 45 degrees with respect to the longitudinal axis, wherein the lanyard receiver is located within 5% of a center of gravity of the conduit reamer along the longitudinal axis.

14. The conduit reamer of claim 13, the first bit comprises a first notch that includes the inner cutting blade and the outer cutting blade, and the first bit comprises a second notch that comprises an inner cutting blade and an outer cutting blade, wherein each of the first and second notches define distinct radii from each other with respect to the longitudinal axis.

15. The conduit reamer of claim 13, wherein the angle is between 30 degrees and 35 degrees.

16. The conduit reamer of claim 13, wherein the inner cutting blade defines an angle between 22.5 degrees and 45 degrees with respect to the longitudinal axis.

17. The conduit reamer of claim 13, further comprising a second bit that comprises a second inner cutting blade and a second outer cutting blade, wherein the first bit and second bit are circumferentially spaced around the bit retainer with respect to the longitudinal axis.

18. The conduit reamer of claim 17, the first bit comprises a first notch that includes the inner cutting blade and the outer cutting blade, the first bit comprises a second notch and a third notch that each comprise an inner cutting blade and an outer cutting blade, wherein each of the first, second and third notches define distinct radii from each other with respect to the longitudinal axis.

19. The conduit reamer of claim 13, the inner cutting blade and outer cutting blade define a recess, wherein the recess defines a depth between 0.5 mm and 2.0 mm.

\* \* \* \* \*